(Model.)

J. ABSTERDAM.
Car-Wheel

No. 227,467. Patented May 11, 1880.

Witnesses
Otto Hufeland.
Wm Miller.

Inventor
John Absterdam.
by VanSantvoord & Hauff
his attys.

UNITED STATES PATENT OFFICE.

JOHN ABSTERDAM, OF NEW YORK, N. Y.

CAR-WHEEL.

SPECIFICATION forming part of Letters Patent No. 227,467, dated May 11, 1880.

Application filed April 8, 1880. (Model.)

*To all whom it may concern:*

Be it known that I, JOHN ABSTERDAM, of the city, county, and State of New York, have invented a new and useful Improvement in Car-Wheels, which improvement is fully set forth in the following specification, reference being had to the accompanying drawings, in which—

Figure 1:
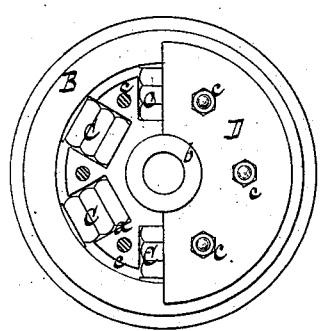
Figure 2:
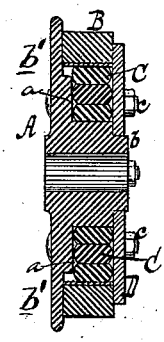
Figure 3:
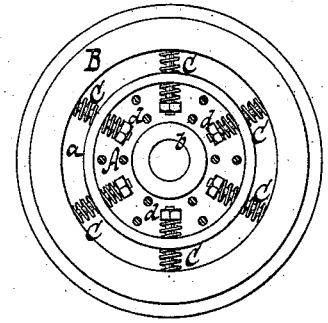
Figure 4:
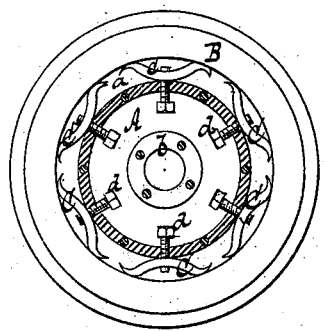
Figure 5:
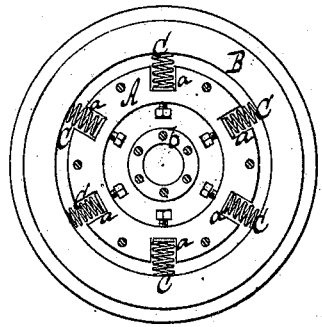

Figure 1 represents a side view of a car-wheel containing my invention, a portion of the side plate being broken away to show the springs. Fig. 2 is a vertical cross-section thereof. Figs. 3, 4, and 5 show modifications in the arrangement of the springs.

Similar letters indicate corresponding parts.

My invention is especially adapted to wheels for elevated railways, its object being to obtain a car-wheel producing less noise in its action on a railroad-rail than the wheels now generally in use.

This invention consists in a car-wheel having a hub constructed with a projecting flange and a recess or recesses containing suitable springs, in combination with a plate or ring having a central aperture fitted and secured upon the outer end of the hub and a solid loose tire resting on the springs, and confined in place between the flange on the hub and the aforesaid plate or ring, as will be more fully hereinafter described.

In the accompanying drawings, A represents the car-wheel, constructed with a hub, $b$, formed with a projecting annular flange, $b'$, and a series of recesses, $a$.

B is the tire, C are the springs, and D is the side plate or ring. The tire B is loose or detached from the body of the wheel, and the springs C are arranged in a recess or recesses, $a$, in the body in such a manner that the tire is thereby supported and held in a concentric position. The side plate or ring, D, is provided with a central aperture, which is fitted and secured upon the outer end of the hub $b$ of the wheel, and said plate or ring is fastened to that side of the body thereof containing the recess or recesses $a$ by bolts C or other suitable means, so that the recesses and the springs are inclosed by said plate or ring, and the loose tire B is confined in place between the flange $b'$ on the hub and the said plate or ring without other means of attachment.

In the examples shown in Figs. 1, 2, and 5 I have arranged each of the springs C in its own recess, while in the example shown in Figs. 3 and 4 they are severally arranged in a common recess. With the springs C shown in Figs. 3 and 4 are combined set-screws $d$, both to keep the same in position and allow of regulating their tension. In the example shown in Fig. 5 I have also combined set-screws with the springs C, for regulating their tension.

It will readily be understood that in the wheel above described the tire possesses a certain amount of elasticity, and is allowed to yield to some extent when the wheel is in motion, so that the blows of the wheel on the rail are softened and the noise due to this cause is diminished.

What I claim as new, and desire to secure by Letters Patent, is—

A car-wheel consisting of a hub, $b$, formed with a projecting flange, $b'$, and a recess or recesses, $a$, containing springs C, in combination with a plate or ring, D, having a central aperture fitted and secured upon the outer end of the hub $b$, and a solid loose tire, B, resting on the springs and confined in place between the flange on the hub and the plate or ring D, substantially as described.

In testimony that I claim the foregoing I hereunto set my hand and seal this 28th day of October, 1878.

JOHN ABSTERDAM. [L. S.]

Witnesses:
 W. HAUFF,
 E. F. KASTENHUBER.